US 9,256,815 B1

(12) United States Patent
Morovic et al.

(10) Patent No.: US 9,256,815 B1
(45) Date of Patent: Feb. 9, 2016

(54) SPECTRAL PRINT CONTROL BASED ON SPECIFIC SPECTRAL RANGES OF COLORANTS

(71) Applicant: Hewlett-Packard Development Company, L.P., Houston, TX (US)

(72) Inventors: Peter Morovic, Sant Cugat del Valles (ES); Jan Morovic, Colchester (GB); Peter J. Klammer, Corvallis, OR (US); James William Stasiak, Lebanon, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/447,201

(22) Filed: Jul. 30, 2014

(51) Int. Cl.
*G06K 15/00* (2006.01)
*G06K 15/02* (2006.01)

(52) U.S. Cl.
CPC .......... *G06K 15/1878* (2013.01); *G06K 15/027* (2013.01); *G06K 15/1881* (2013.01)

(58) Field of Classification Search
None
See application file for complete search history.

(56) References Cited

U.S. PATENT DOCUMENTS

| | | | |
|---|---|---|---|
| 5,422,489 A * | 6/1995 | Bhargava ............ | 250/488.1 |
| 6,324,305 B1 * | 11/2001 | Holladay et al. ............ | 382/239 |
| 6,734,869 B2 * | 5/2004 | Murashita et al. ........... | 345/589 |
| 6,956,702 B2 * | 10/2005 | Pate .............................. | 359/634 |
| 8,213,055 B2 * | 7/2012 | Morovic et al. .............. | 358/3.06 |
| 8,228,559 B2 * | 7/2012 | Parmar et al. ................. | 358/2.1 |
| 8,310,498 B2 | 11/2012 | Ben-Chorin et al. | |
| 8,331,661 B2 * | 12/2012 | Imai .............................. | 382/162 |
| 8,358,318 B2 * | 1/2013 | Edge ............................ | 345/589 |
| 8,456,700 B2 | 6/2013 | Mestha et al. | |
| 8,953,926 B1 * | 2/2015 | Kelly et al. ................... | 385/146 |
| 2002/0149656 A1 * | 10/2002 | Nohr et al. ...................... | 347/95 |
| 2013/0335783 A1 * | 12/2013 | Kurtz et al. ................. | 358/3.28 |

FOREIGN PATENT DOCUMENTS

CN 101585257 A 11/2009

OTHER PUBLICATIONS

Dharavath et al., Green Printing: Colorimetric and Densitometric Analysis of Solvent-based and Vegetable Oil-based Inks of Multicolor Offset Printing, The Journal of Technology Studies, vol. 35, No. 2, Winter 2009, http://scholar.lib.vt.edu/ejournals/JOTS/v35/v35n2/dharavath.html.

* cited by examiner

Primary Examiner — Steven Kau
(74) Attorney, Agent, or Firm — HP Inc. Patent Department (57) ABSTRACT

Certain methods and systems are described that allow the spectral control of a print output. A plurality of colorants are used where one or more colorants contain nanoparticles. Each colorants has a specified spectral range corresponding to the constituent nanoparticles. To print with these colorants a spectral separation may be used that maps an input color with associated spectral information or direct spectral information to print control data, the print control data having defined values for depositions with each combination of the colorants. The spectral separation may be constructed by characterizing a set of spectral Neugebauer primaries for the plurality of colorants.

13 Claims, 7 Drawing Sheets

SPECTRAL PRINT CONTROL BASED ON SPECIFIC SPECTRAL RANGES OF COLORANTS

BACKGROUND

When printing it is desired that a printed color matches a color of source content as closely as possible, for example under any viewing or illumination conditions. Printing commonly uses a colorimetric approach to visually match the printed color to the color of source content. Colorimetry approximates human color perception by representing the color of observed surfaces or objects under a single set of viewing conditions using tristimulus values—one for each of the three types of light sensitive cells (cones) lining the retina at the back of the human eye. One type of cone cell is sensitive mostly to long wavelengths (L), another to medium wavelengths (M) and yet another to short wavelengths (S) of electromagnetic radiation in the visible range (i.e., from approximately 400 to 700 nm). Mostly for historical reasons, colorimetry uses a linear transformation of the LMS space, derived from psychophysical color matching experiments, called XYZ, defined by the CIE (Commission Internationale de l'Eclairage). The tristimulus values of X, Y and Z of a colorimetric approach form the basis of approximately representing all colors seen by a human visual system, tied to a set of viewing conditions, especially an illuminant present in the observed scene. Colors are thus identified based on co-ordinates in this CIE XYZ space.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain examples described herein relate to color mapping in an imaging system. Color mapping is a process by which a first representation of a given color is mapped to a second representation of the same color. Although "color" is a concept that is understood intuitively by human beings, it can be represented in a large variety of ways. Color intrinsically relates both to a physical stimulus as well as to its perception or interpretation by a human or artificial observer under a given set of conditions. The physical foundation relates to the spectral power distributions of the illuminating light source and the reflective or transmissive properties of an object or surface as well as the observers' spectral sensitivities. Further elements affect color, such as temporal or spatial effects. The perception of color is then the joint effect of all this elements. There are different ways to describe color, the descriptions differing, for example, in how limited their validity is. For example, in one case a surface may be represented by a power or intensity spectrum across a range of visible wavelengths. This provides information about a physical property of the surface, but not about the ultimate color as that also depends on the illuminant and an observer, spatial context etc. At the other extreme, a surface's color can be described with all other conditions fixed, e.g. the tristimulus values of the surface under an average intensity daylight-simulating illuminant against a gray background, in which case a Color Appearance Model would be used to describe it. In yet other cases, a "color" may be defined as a category that is used to denote similar visual perceptions; two colors are said to be the same if they produce a similar effect on a group of one or more people. These categories can then be modelled using a lower number of variables.

Within this context, a color model may define a color space. A color space in this sense may be defined as a multi-dimensional space, wherein a point in the multi-dimensional space represents a color value and dimensions of the space represent variables within the color model. For example, in a Red, Green, Blue (RGB) color space, an additive color model defines three variables representing different quantities of red, green and blue light. Other color spaces include: a Cyan, Magenta, Yellow and Black (CMYK) color space, wherein four variables are used in a subtractive color model to represent different quantities of colorant, e.g. for a printing system; the International Commission on Illumination (CIE) 1931 XYZ color space, wherein three variables ('X', 'Y' and 'Z' or tristimulus values) are used to model a color, and the CIE 1976 (L*, a*, b*—CIELAB or 'LAB') color space, wherein three variables represent lightness ('L') and opposing color dimensions ('a' and 'b'). A spectral space instead may comprise a quantized variable space representative of a reflectance, emission and/or power spectrum. This space may have a number of variables representative of sampled wavelength values or wavelength ranges and one or more variables representations of one or more of a measured or modelled reflectance, emission and power value. By itself a spectral space does not determine color directly, instead it can be projected onto a variety of color spaces such as a corresponding set of XYZs colorimetries under additional conditions including an illuminant. Certain color spaces, such as RGB and CMYK may be said to be device-dependent, e.g. an output color with a common RGB or CMYK value may have a different perceived color when input to different imaging systems.

When working with color spaces, the term "gamut" refers to a multi-dimensional volume in a color space that represents color values that may be output or captured by a given imaging system. A gamut may take the form of an arbitrary volume in the color space wherein color values within the volume are available to the imaging system but where color values falling outside the volume are not available. A "spectral gamut" is the equivalent volume in a spectral space. The terms color mapping, color model, color/spectral space and gamut, as explained above, will be used in the following description.

Certain examples described herein provide an ability to control a print output spectrally rather than colorimetrically, e.g. based on variables representative of spectral quantities as opposed to tristimulus values. This allows for colors in print outputs to match colors in source content under a wide range of viewing and/or illumination conditions. More generally, it enables a match at the spectral level, independent of viewing conditions. To achieve this, certain examples make use of a colorant set that is capable of reproducing electromagnetic spectra representative of one or more colors of source content. For example, these spectra may be measured from a desired color representation, such as from a display device, photograph, object etc. Given this colorant set and an input color with associated spectral information, e.g. an indication of a desired spectral output, certain examples described herein can match this input color spectrally.

In certain cases described herein, a set of colorants are configured to provide a number of "color channels" that are characterized in spectral space, e.g. that have specified spectra. For example, one or more colorants may have suitable properties based on nanoparticles such as quantum dots. These nanoparticles may be configured to have a particular emissive spectrum. In certain case, this spectrum may include narrow-band emissive regions, e.g. narrow in relation to the full range of visually perceivable colors. In other cases, the emissive spectrum may be parameterized by one or more peak emission values and one or more wavelength ranges.

In certain cases described herein, an ability to control a print output spectrally allows for a spectral print pipeline, e.g. a set of print processing stages from a data file input to a print output. This spectral print pipeline can make full use of a pipeline without metamerism and color inconstancy. A spectral pipeline results in reproductions that match the input spectra as closely as possible and, assuming a perfect match, cannot be distinguished from the original, regardless of the conditions (illuminants, observers) under which they are inspected. This is in contrast to a colorimetric pipeline where a match is sought under a single set of conditions, typically in print this is illuminant D50 and the CIE 1931 Standard Colorimetric Observer, since the pipeline is based on XYZ tristimuli for these conditions. Also, a spectral pipeline that has access to spectrally narrow-band (sometimes referred to as 'pure') inks may provide large gamut gains in comparison to a colorimetric print pipeline using comparative inks as the spectrally pure primaries are at the boundary of physically realizable spectra. For example a spectrally pure 'red' may have a single, narrow-band peak emission in its spectrum at around 610 nm with no other emissions elsewhere. This spectrum is impossible to achieve on a comparative printing system with typical inks as combining a Magenta and a Yellow ink which have broad absorptions and broad emissions across the visible range. In this context a "spectral primary" comprises a colorant with a particular spectral profile, e.g. a defined power distribution with reflectance/emission in one set of ranges, the power distribution representing, at each wavelength, the proportion of incident electromagnetic radiation that is respectively reflected, emitted and absorbed.

Figure 1:
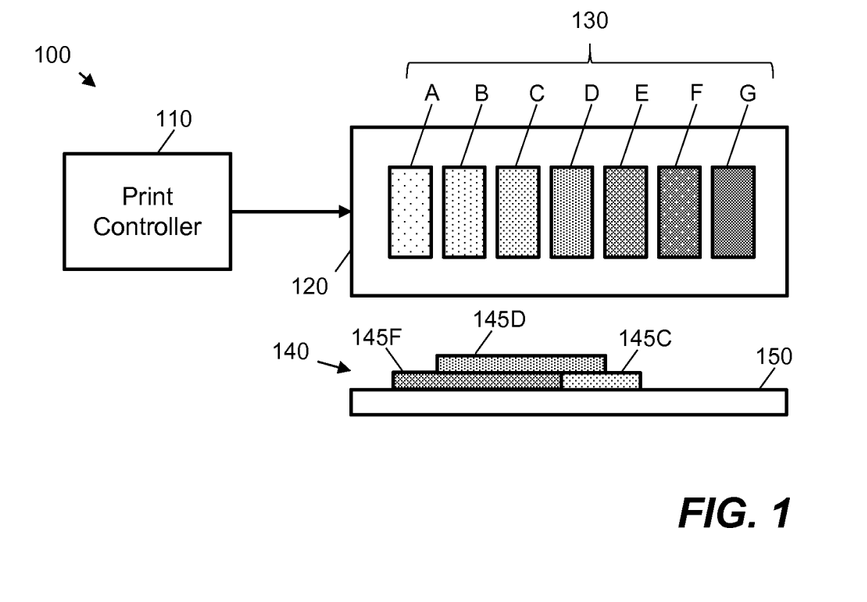
FIG. 1 is a schematic illustration of a system for spectral printing according to an example.

FIG. 1 shows a system 100 for spectral printing according to an example. The system 100 comprises a print controller 110 and a printing device 120. The printing device 120 is arranged to use a plurality of colorants 130 to produce a print output 140 on a substrate 150. For example, the printing device 120 may comprise an ink jet printer with a number of print heads that are arranged to emit the plurality of colorants. In the example of FIG. 1 there are seven colorants labelled A to G. The print output 140 comprises portions of colorant 130 that are deposited onto the substrate 150 by way of the printing device 120. In the example of FIG. 1, an area of the print output 140 comprises a colorant overprint, in that a portion of deposited colorant C—145C—and a portion of deposited colorant F—145F—is overprinted with a portion of colorant D—145D. The print controller 110 is arranged to generate print control data from input image data (not shown). The print control data has defined values for depositions with each combination of the colorants 130. In certain cases the print control data may comprise a distribution vector that specifies a distribution of colorant depositions, e.g. a probability distribution for each colorant and/or colorant combination for a pixel of a print image or, in other words, an area coverage vector for a set of colorant combinations or overprints. The term "colorant" as used herein refers to any colorant suitable for printing, including, amongst others a printing fluid, for example an ink, a gloss, a varnish or a coating, and non-fluid printing materials, for example a toner, a wax or a powder used in laser printing or dry electrophotography; any references to "ink" as used below include a colorant as so defined.

As described in more detail in later examples, one or more of the colorants 130 comprise additives that configure the spectral properties of the colorant, e.g. the measured spectra when the colorant is deposited on the substrate 150. In this example, the additives comprise nanoparticles. These may be nano-crystals such as quantum dots. These quantum dots comprise semi-conductor-like materials that may be configured and manufactured such that they exhibit narrow-band emission spectra within the visible range and defined absorption profiles outside of the visible range, e.g. in the ultra-violet or infra-red range. A colorant may comprise a quantum dot material component with a concentration of less than 1% by weight to around a few % by weight. These spectra may have a controlled peak location and a controlled full width at half maximum (FWHM). For example, quantum dots of the same material but different sizes may emit light in different wavelength ranges due to the quantum confinement effect. For certain materials, the larger the quantum dot the longer the wavelength of the spectral peak (e.g. the redder the perceived output); while the smaller the quantum dot the shorter the wavelength of the spectral peak (e.g. the bluer the perceived output). Quantum dots may range from 2 to 50 nm in size for certain materials and production techniques. In certain cases shell size may also be configured to affect the properties of the quantum dot. Quantum dots may also be configured to absorb electromagnetic radiation both within as well as outside of the visible range, for example light in the ultra-violet or infra-red range. In general, the nanoparticles may have one or more of up-converting and down-converting properties, i.e. it may absorb radiation at a given set of wavelengths and re-emit radiation at a set of wavelengths which is lower or higher than the radiation it absorbs.

In certain cases the set of colorants 130 define a set of spectral color channels or 'spectral primaries', each spectral channel being centered on a particular peak wavelength and having a defined FWHM. The number of spectral primaries, and hence in certain cases the number of colorants, may be configured to reproduce any spectra measured at N wavelength samples. For example, if a visible range is said to be between 400 nm to 700 nm and this range is sampled at 20 nm steps, then N=16 spectral primaries are required to reproduce the spectra exactly. In one case, the set of spectral primaries may be arranged to reproduce a particular set of content; as such the number of spectral primaries may be chosen to match the requirements of the content. For example, if a set of content has a predetermined spectral range, e.g. that is less than the visible range, fewer spectral primaries may be required to reproduce the content at a given sampling level. Additionally or alternatively, when modelling a spectral gamut for a particular printing device it may be that the available gamut does not span the entire dimensional domain, e.g. all 16 dimensions in the previous example. In this case, certain primaries in the group of 16 could be omitted while minimizing the effect on the available spectral gamut.

Figure 2:
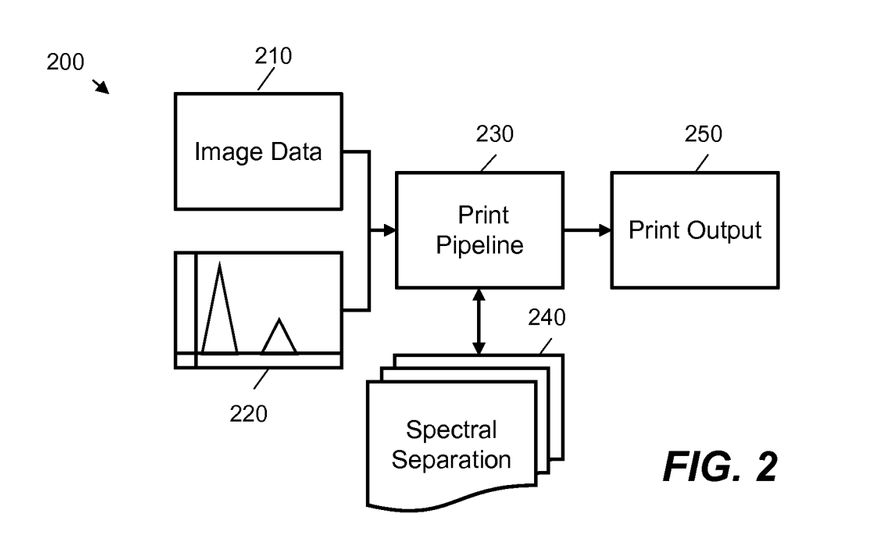
FIG. 2 is a schematic illustration showing a print pipeline according to an example.

FIG. 2 is a schematic illustration showing an imaging system 200 according to an example. This imaging system 200 may be used to print an image spectrally. The imaging system 200 comprises a print pipeline 230 that is arranged to receive data 210 representative of an image to be printed and to generate a print output 250. In certain cases, the print pipeline 230 may comprise print controller 110 and printing device 120 of FIG. 1, wherein print output 250 is print output 150. The print pipeline 230 is arranged to receive spectral information 220 associated with the image data 210. The print pipeline 230 uses one or more spectral separations 240 to convert the image data 210 and the spectral information 220 to print control data that is used to generate the print output. In one implementation, the print pipeline 230 may be arranged to handle input with spectral information and generate a weighted combination of spectral Neugebauer primaries as an input to a halftoning process before print.

In one case the spectral information 220 may comprise sampled spectral data for one or more pixels of the image to be printed. For example, in the case above with sample steps of 20 nm, a pixel may have associated spectral information in the form of a spectral vector, the vector having sixteen values and each value representing a measured or desired reflectance, emission and/or power value at a particular sampled wavelength. In one case, a reflectance/normalized emission value may be used, e.g. a value between 0 and 1 (i.e. 0 and 100%). This value expresses the light that is reflected or emitted at that pixel as a proportion of the incident radiation.

In one case the spectral information 220 may not be defined for all pixels in the image to be printed and/or for all input color values in the image data 210. For example one or more specific spectral objectives may be set for the print output 250 to match. These may comprise a requirement that a colorimetric reproduction matches source content under a series of illuminants, having additional a-priori information about the types of spectra that are desired in the print output. In this case the image data 210 may comprise tristimulus values (e.g. RGB or XYZ based) and the desired spectra associated with certain tristimulus values may be defined. This may be the case for desired 'spot' colors such as brand colors or for certain pigments in paintings for which a colorimetry or contone RGB value is associated may have a defined spectral output, e.g. in the form of a sampled spectra. In other cases one or the spectrally-defined objectives may comprise a requirement for minimum color inconstancy between an input color and a print output. Another case could define the spectral objective as minimizing metamerism within the single reproduction—i.e. choosing spectra such that if they match under one set of illuminant conditions they also match under another—or vice-versa, maximizing metamerism whereby the match only holds under limited conditions and its mismatch is maximized under other conditions.

In the example of FIG. 2, a spectral separation 240 provides a mapping from the image data 210, together with any requirements set by the spectral information 220, to print control data, e.g. data that is used by printing device 120 to deposit colorants. In cases where particular color values in the image data 210 have associated spectral information 220, such as a defined spectral output, a spectral separation 240 may map one or more of the color values and the defined spectral output to print control data comprising an output value having a probability distribution for each colorant and/or colorant combination. This may comprise processing the color data for the image and any associated spectral information to generate an input spectral vector that is mapped to a spectral Neugebauer primary area coverage vector (SNPac) for the defined set of colorants. In this case, a spectral separation 240 may be defined as a look-up table in a spectral domain, with SNPac vectors as the output in each node of the table. In another case, image data 210 may be mapped to a vector of colorant percentages or proportions for each pixel in the print output. In this case, the colorant percentage vector may be input into a halftoning process to generate print control data. In the former case where SNPac vectors are used, at least a portion of the halftoning process may be integrated into the mapping stage, e.g. as is the case in a Halftone Area Neugebauer Separation (HANS) system.

A configuration of the one or more spectral separations 240 may depend on the constraints of any implementing environment. For example, in a case where there may be size limitations on any used look-up table, a spectral separation may provide a mapping from a desired spectral input to print control data for image data associated with a predefined list of desired spectra while providing a colorimetric mapping, e.g. from input tristimulus values or device color coordinates to print control data for image data that is not associated with a predefined list of desired spectra. This may be applied for the printing of spot colors where a spectral fit may be of particularly high value, e.g. tristimulus or device color image data values associated with these spot colors may have a spectral mapping whereas tristimulus or device color image data values not associated with these spot colors have a mapping from a colorimetric input.

In another case, a direct spectral look-up table may be generated with a limited and predetermined set of mapping nodes. In this case the image data 210 may comprise the spectral information 220, e.g. in the form of a sampled spectral vector for each pixel. For example, the spectral mapping nodes may be chosen at approximate colorimetric locations (e.g. skin-tone like reflectances or other memory-color reflectance areas) known to be particularly sensitive to perceived color mismatch and/or for spectra where high accuracy is important. In this case, N-dimensional simplex interpolation may be used for values between the nodes, where N is the number of spectral samples used to represent the image data 210.

In a further case, image data in a spectral form may be first converted to a dimensionally-reduced domain such as a Lab-PQR color space, where P, Q and R correspond to "metameric blacks". This may then be mapped to print control data, e.g. to values in a SNPac space. Alternatively, image data may be received in this domain and again mapped to a SNPac space.

Figure 3:
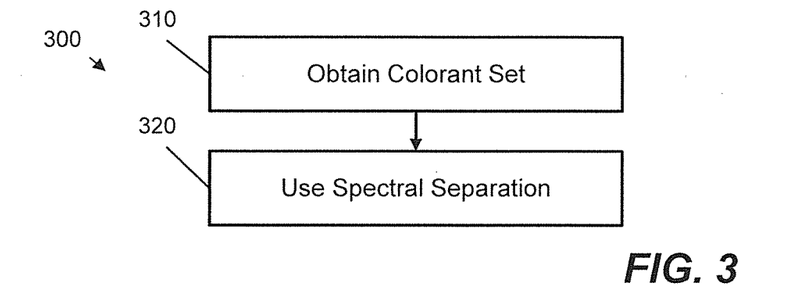
FIG. 3 is a flowchart showing a method of using a spectral printing system according to an example.

FIG. 3 shows a method 300 of configuring a generating a spectral separation according to an example. This method may be used to generate one or more of the spectral separations used in the imaging system of FIG. 2 and/or to configure the print controller 110 of FIG. 1.

Figure 6A:
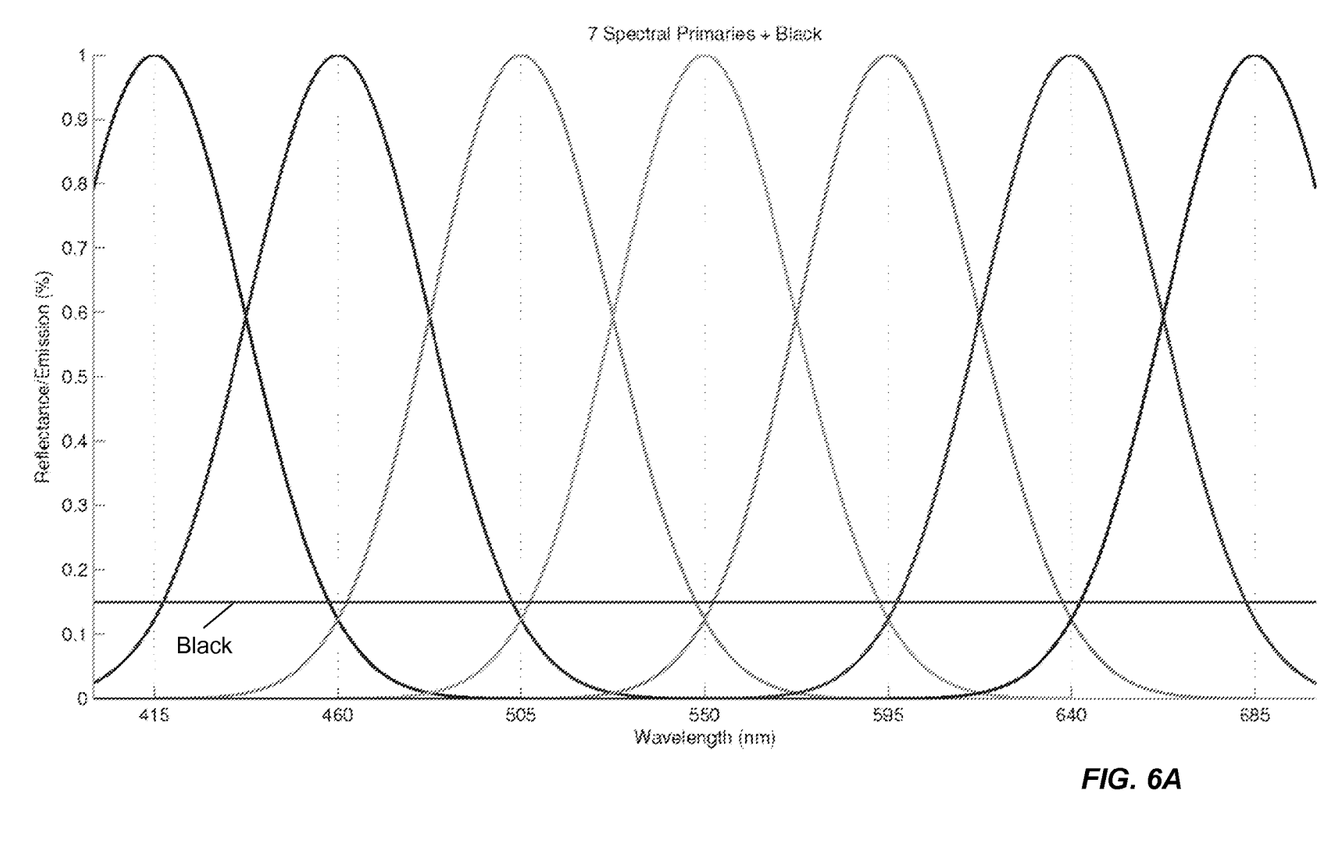
FIGS. 6A, 6B and 6C are spectra showing the wavelength ranges for a set of spectral primaries according to an example.
Figure 6B:
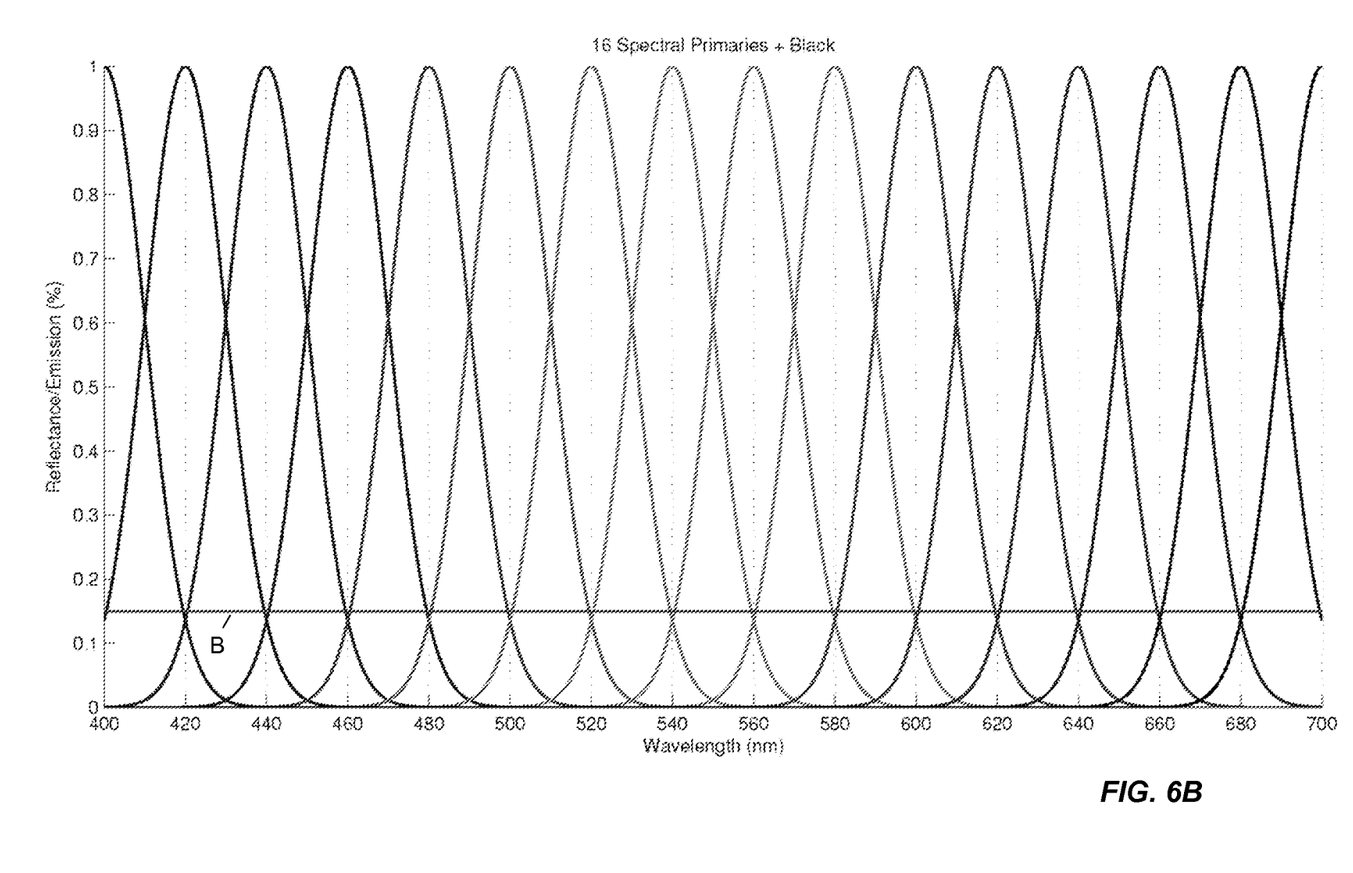
Figure 6C:
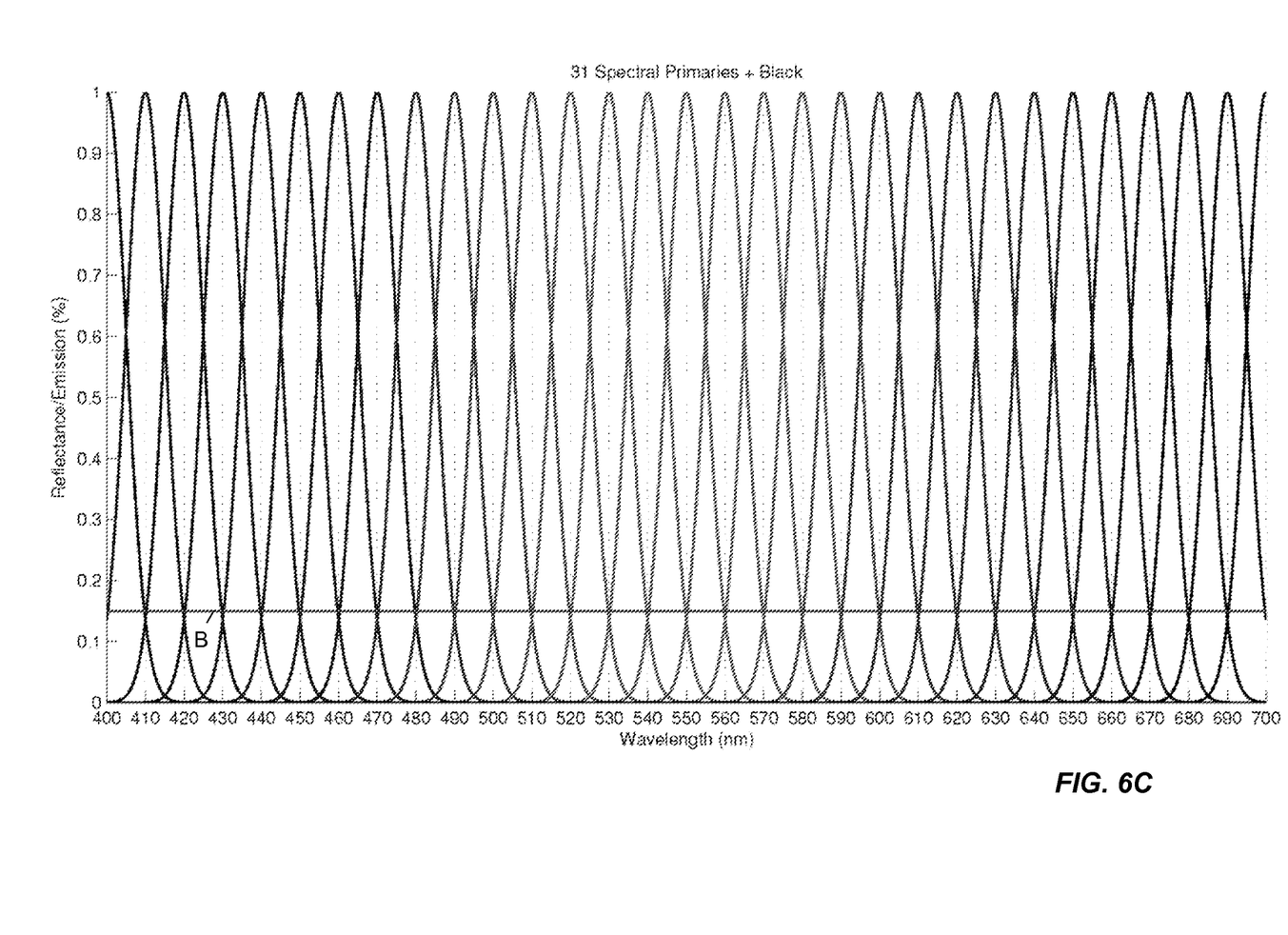

At block 310, a colorant set is obtained. This may be the plurality of colorants 130 shown in FIG. 1. To achieve this a set of narrow-band emission spectra are defined. For example, a desired number of spectral channels based around a desired set of peak wavelengths may be defined. These may then be used to determine and/or develop a set of additives that provide the defined spectra. For example, a number N of spectral channels may be required in a range of visible wavelengths (for the human visual system). The level of spectral control will depend on the number of channels available whereby spectral channels may be designed to remain as narrow-band as possible while covering the entire visible range. The range of visible wavelengths may thus be divided by N and a FWHM defined such that each spectral channel is discernable. A set of defined spectral channels where N respectively equals 31, 16 and 7, plus an additional black (B) channel, are shown in FIGS. 6A to 6C. Once each spectral channel is defined the material properties of a set of photoluminescent materials like quantum dots may be specified. The design of these materials allows for independent colorants that correspond 1-to-1 to the spectral channels, e.g. spectral channel 1 may have a peak at 400 nm with FHWM of 20 nm and spectral channel 16 a peak at 700 nm with the same FWHM (as shown in FIG. 6B). A halftone in this domain will therefore have 17 planes (16 spectral primaries plus the black channel). However the domain of the spectral separation is in a spectral Neugebauer Primary area coverage domain which allows independent control not only of the colorants in isolation but also their overprints. Such treatment of the spectral primaries allows for their independent use, as is the case in a comparative pipeline as well, however the spectral primaries or inks being spectral and emissive in this case means that, coupled with an appropriate pipeline, any conceivable spectrum can be constructed. Although quantum dots have been used as an example any material and/or additive that provides narrow-band spectral emission may be used to define a colorant.

In this example, the spectral channels or "spectral primaries" are defined to be additive in terms of the resulting spectral power distribution. In one implementation they may thus be printed on a black, i.e. absorptive and spectrally non-selective, substrate. In another implementation, the narrow-band spectral emissive primaries may be coupled with a black absorptive ink. In this implementation, both a black and a gray may be used if the appearance of a halftone grain is of a particular concern. Use of a black absorptive ink in this case allows for an efficient and spectrally-non-selective neutral axis, that when combined with the spectral primaries is able to extend a gamut into darker areas. FIGS. 6A to 6C show a case where the respective 31 (plus black), 16 (plus black) and 7 (plus black) spectral primaries are defined together with an added black absorptive primary. Each spectral primary is shown with an approximately Gaussian reflectance/emission profile, while the black profile has a constant reflectance/emission value across the visible wavelength range (about 15% in the Figures).

Returning to FIG. 3, at block 320 a spectral separation is used to maps an input color with associated spectral information to print control data. The spectral separation has an output space that has defined values for depositions with each combination of the colorants defined in block 310. Hence, the spectral separation maps from the input color to print control data characterized in terms of the spectral primaries. An example with further detail on determining a spectral separation is described with reference to FIG. 4 below. The spectral separation referenced at block 320 is usable to produce a print output using the plurality of colorants obtained at block 310, e.g. may be useable as a spectral separation 240 or as a control configuration for print controller 110.

Figure 4:
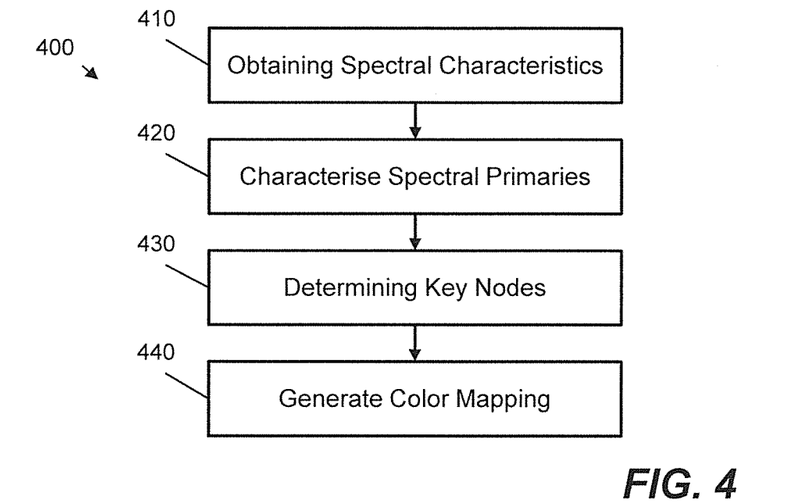
FIG. 4 is a flowchart showing a method of generating a spectral mapping according to an example.

FIG. 4 shows a method 400 of generating a spectral mapping according to an example. This spectral mapping may form part of a "spectral" separation, e.g. the method 400 may be used to generate the spectral separation of block 320 of FIG. 3.

At block 410 of FIG. 4 a set of spectral characteristics are obtained. Both emissive and absorptive properties may be obtained. This may be achieved through one or more of measurement and modelling. In one implementation, an ink template may be used. In this implementation, an image may be printed with a number of test patches. The test patches may comprise different distributions of each of the colorants described previously. For example, each test patch may be printed based on a different SNPac vector, i.e. with different proportions of different ink-overprints. The spectral properties of the test patches may then be measured, e.g. using a spectrometer or spectrophotometer, which may or may not form part of the printing system. The test patches may be measured using a sampling scheme that corresponds to the number of spectral primaries, e.g. with sampled measurements at N different wavelength bins. Each measurement may be a reflectance/normalized emission value. In another implementation, values for spectral properties may be obtained from an accessible resource, such as a network and/or storage device.

At block 420, a set of spectral Neugebauer primaries for the plurality of colorants are characterized based on the obtained spectral characteristics. In this case a spectral Neugebauer primary represents an available colorant overprint combination. The number of spectral inks (i.e. physical colorants) determines the number of spectral primaries (the domain of the spectral separation). If there are N spectral inks covering the visible range and each ink can be placed at k states (e.g. no ink, one drop, two drops, etc. to k−1 drops) then there are $k^N$ spectral Neugebauer primaries. In this case the test patches are printed across the range of colorants, and the spectral properties of the print output are analyzed so as to identify the spectral Neugebauer primaries. An output of block 420 may comprise a set of output spectra for respective spectral Neugebauer primaries having one or more colorant-overprint distribution values for a print substrate. This may take the form of a set of a print control vector comprising colorant distribution values for each of the spectral Neugebauer primaries (e.g. SNPacs) and their associated sampled spectra. In this case a SNPac may be the result of an ink-limited spectral Neugebauer primary, e.g. a spectral primary overprint that is limited by the physical capabilities of a given printing device.

At block 430, given a set of output spectra for respective spectral Neugebauer primaries, one or more key nodes of a spectral mapping such as a look-up table may be defined. This may comprise defining key nodes for specific desired output spectra, e.g. a close match between a given spectral output and a given spectral or colorimetric input may be required for key "spot colors". Output print control vectors for these nodes are determined first by interpolation between the print control vectors comprising colorant distribution values for each of the spectral Neugebauer primaries. At block 440 a desired resolution of the spectral separation is determined, e.g. the number of nodes in a look-up table. Color mappings for these remaining nodes from an input (e.g. either a spectral or colorimetric) value to a print control vector are then defined by way of interpolation in the output spectral Neugebauer primary space between the key nodes and the print control vectors comprising distribution values for each of the spectral Neugebauer primaries.

Figure 5:
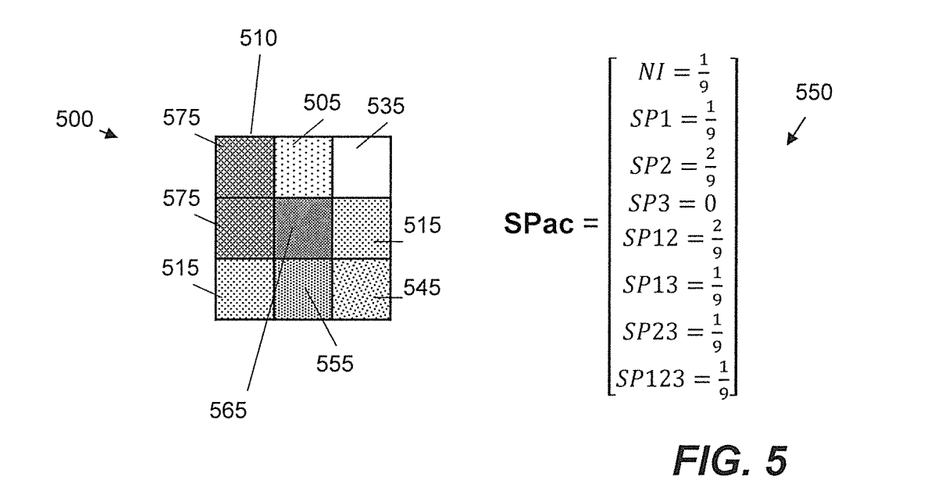
FIG. 5 is a schematic illustration of a print control vector according to an example.

An example of a print control vector that may form an output of a spectral separation is schematically illustrated in FIG. 5. As discussed above, in one case, the print control vector may comprise colorant overprint statistics to represent a reflectance or emission spectrum. For example, an output value may comprise a spectral-primary-overprint area-coverage, i.e. a spectral Neugebauer primary area coverage or SNPac vector 550. In this case, the colorant overprint statistics may represent a color halftone that is printable on an M-level printing device. This may be compared to a comparative case wherein ink vectors are used as an output color space. In this comparative case, a color value, e.g. that represents a pixel or other image portion, may comprise a continuous tone value, such as a percentage of each of the available inks in a printing device (e.g. in a CMYK system—[C=20%, M=30%, Y=0%, K=0%]). In the comparative case, this continuous tone value may then be input into a separate halftoning system that applies a particular spatial pattern (a halftone 'screen') and provides a discrete (e.g. binary in a 2-level printing device) ink-deposition control output. Colorant overprint statistics, on the other hand, provide an output that is representative of different colorant overprint coverages over a virtual unit area rather than proportions of ink amounts for a pixel. Put in other words, a SNPac vector may be seen as representing a colorant overprint probability distribution for a pixel, i.e. the likelihood that a particular colorant or colorant combination will be printed at the pixels location. This vector may be used to set specific pixel values according to these probabilities for a given unit area.

As discussed above, a spectral Neugebauer primary may be defined as a combination of one or more custom colorants (e.g. inks) in an imaging system, wherein the total set of spectral primaries represent the total number of colorants combinations that can be output by the imaging system. A spectral Neugebauer primary may thus represent one ink, e.g. one of fluids 130, overprinted by one or more other inks, e.g. another of the fluids 130 in an addressable area on the substrate 150. For example, if printing device 120 is a binary (bi-level) printer, a spectral Neugebauer primary is one of $2^k$ combinations of k colorants. Other examples may also incorporate multi-level printers, e.g. where print heads are able to deposit M drop levels (e.g. M=3 for a system capable of 0, 1, 2 drop levels). In this case a spectral primary may comprise one of $M^k$ combinations of k inks. The term colorant as applied herein applies to, amongst others, inks, fluids, solids and powders as well as glosses and/or varnishes that may be deposited in a printing system and that may alter a perceived output color; these may be modelled as spectral primaries when additives are used as described herein.

Returning to FIG. 5, this shows a SNPac vector 550 for an example case with three spectral primaries: SP1, SP2 and SP3. In this case there are eight colorant overprint combinations, i.e. eight spectral Neugebauer primaries: no ink (NI), SP1, SP2, SP3, SP1+SP2, SP1+SP3, SP2+SP3 and SP1+SP2+SP3. This example shows a three-by-three pixel area 310 of a print output where all pixels have the same SNPac vector: vector 550. The vector 550 defines the probability distributions for each spectral Neugebauer primary for each pixel. Hence, in the print output there is one pixel of no ink (335); one pixel of SP1 (305); two pixels of SP2 (315); no pixels of SP3; two pixels of SP1+SP2 (375); one pixel of SP1+SP3 (345); one pixel of SP2+SP3 (355); and one pixel of SP1+SP2+SP3 (365). As can be seen, the component values of each SNPac vector sum to one. As such, the SNPac vector is representative of the ink overprint statistics of a given area.

As described above, certain methods and systems provide an ability control print spectrally by means of custom-additive modified colorants. This may provide access to a large gamut due to the spectrally narrow band spectral channel design. This in turn contributes to ink-efficiency over comparative color gamuts. For example, a system with N narrowband spectral primaries results in a gamut (under any illuminant) that has vertices which coincide with the Object Color Solid—the set of all physically possible surfaces—which is significantly beyond the capability of comparative printing systems with inks with broad absorptions and emissions. A large gamut in turn means that over the area of a typical gamut of a comparative pipeline, even at its extremes, there is large redundancy in terms of the set of SNPacs that match a color where a comparative pipeline would have a single candidate (e.g. a primary at full intensity). Large redundancy in turn results in the ability to optimize for attributes, such as ink-use. Hence, a spectral pipeline as described in certain examples, may allow for better ink-efficiency over the volume of a comparative pipeline, while also being able to extend its gamut.

Certain methods and examples may provide advantages over comparative spectral printing systems that use standard colorants (e.g. CMYK-based). These comparative systems are limited as the standard colorants are not designed for spectral printing; for example, they may be strongly spectrally correlated with each other as well as each individual ink having strongly correlated wavelengths, meaning it is impossible to address wavelengths as such. As a result the spectral performance of such comparative spectral printing systems, e.g. a measured spectral match with a defined input spectrum, may be indistinguishable from the spectral performance of colorimetric data workflows using the same inks.

Figure 7:
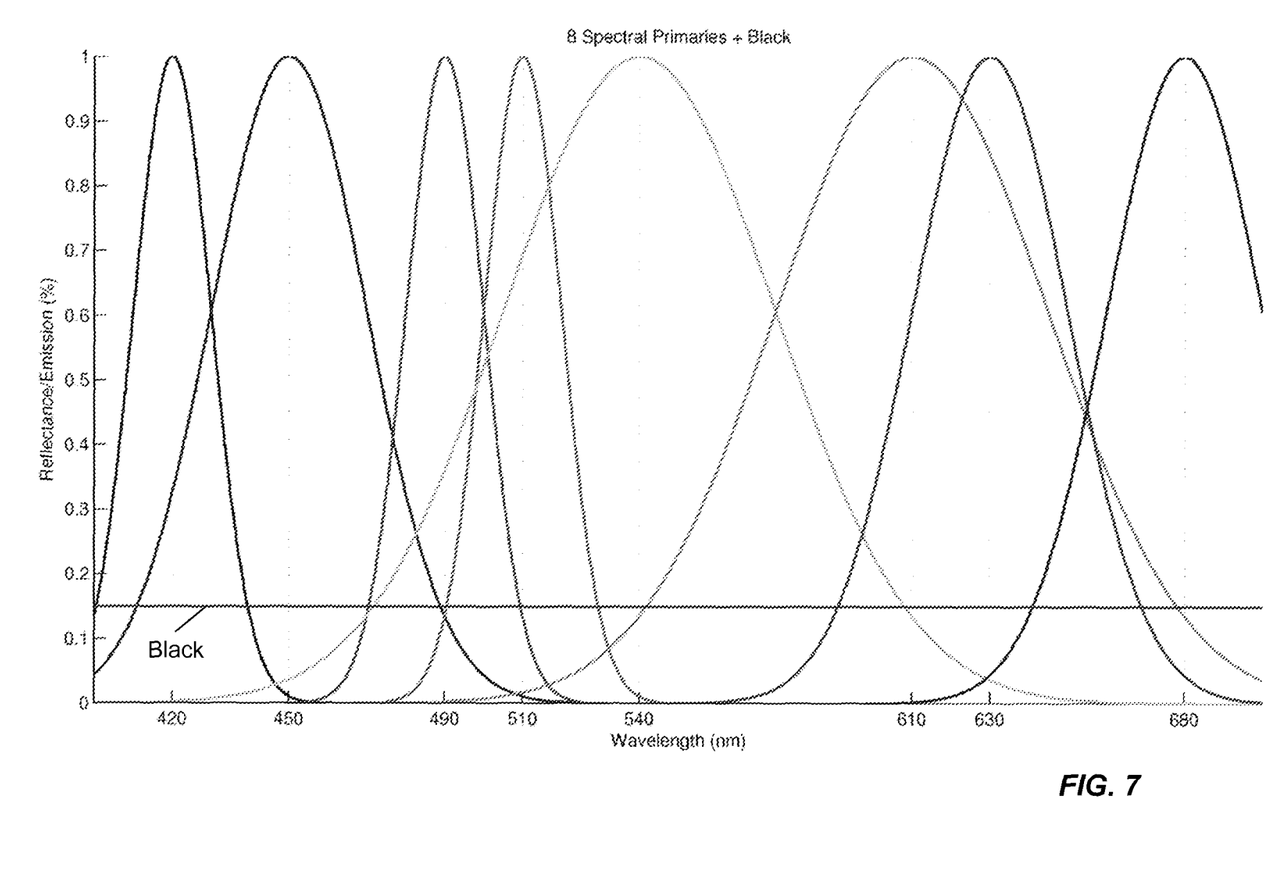
FIG. 7 is a spectrum showing non-uniform wavelength ranges for a set of spectral primaries according to an example

A variation of the spectral channels shown in FIGS. 6A to 6C will now be described with reference to FIG. 7. Although these spectral channels may also be described as "color channels", as they may be used to output a color image, they are spectral rather than colorimetric. In this variation a set of spectral primaries provide a non-uniform distribution of peak emission values and wavelength ranges over a visible wavelength range. For example, one or more of the spacing of peak wavelength values, FWHM values and emission profile may be non-uniform across a set of spectral primaries. An example of this variation is shown in FIG. 7 wherein there is a non-uniform spacing between peak emission values and FWHM values. FIG. 7 shows eight spectral primaries together with a black primary, the latter being constant across the visible range.

A non-uniform spectral primary selection and representation has a number of advantages. It allows for encoding efficiency: use of non-uniform spectral primaries may reduce the size and/or complexity of any spectral separation (e.g. the size and/or complexity of the look-up table used to implement the spectral separation). Using non-uniform variation may help to minimize the required number of spectral dimensions. Also the human visual system does not perceive all wavelengths equally due to the configuration of the cone cells in the retina. Hence, a particular spectral primary may have a larger FWHM value in a portion of the visible spectrum where the human visual system is less able to discriminate between wavelength values, or where it is useful to have a broad spectrum for efficiency (e.g. the 'green' primary anchored around 540 nm which broadly relates to the Y channel in XYZ). For example, a configuration for the set of spectral primaries may be determined by analyzing the types of spectra that are desired to be reproduced and placing peak emissions at wavelengths where correlation is low in the target data. In terms of dimensionality reduction, the variation illustrated in FIG. 7 may be perceived similarly to that of FIG. 6A or 6B; however the resulting non-uniform representation is lower dimensional in terms of the spectral sampling—e.g. in FIG. 7 only eight spectral samples are needed at the peak wavelength positions: [420, 450, 480, 510, 540, 610, 630, 680], as compared to 31 or 16 samples as is required with a uniform sampling from 400 to 700 at 10 or 20 nm steps. The result is an 8-dimensional (D) spectral separation or look-up table rather than a 16D or 31D separation.

Certain examples described herein provide both a spectral means to control a print coupled with inks designed to cover a large spectral variety (e.g. parametrizeable by the number of inks available in a system) as well as a significantly bigger colorimetric gamut than is possible with comparative, absorptive inks. The examples may be used with both colorimetric and spectral HANS print pipelines. Although reference is made to a plurality of colorants in association with described example printing systems, the plurality of colorants may be used independently and/or individually.

Figure 8:
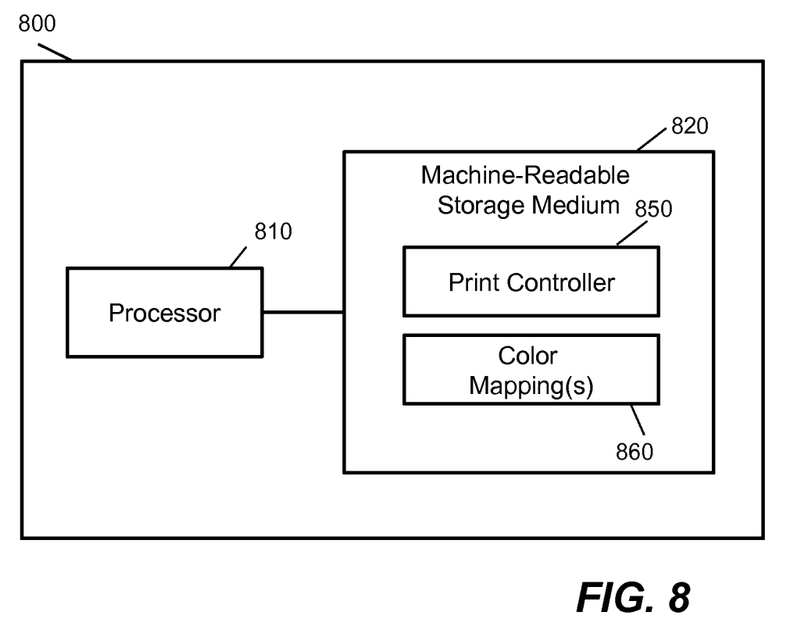
FIG. 8 is a schematic illustration of a processing device that may be used to implement at least an encoder according to an example.

Certain methods and systems as described herein may be implemented by a processor that processes computer program code that is retrieved from a non-transitory storage medium. FIG. 8 shows an example of an imaging system 800 comprising a machine-readable storage medium 820 coupled to a processor 810. In certain case the imaging system 800 may comprise a computer; in other cases the imaging device may comprise a printer, scanner, display device, portable computing device or the like. Machine-readable media 820 can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In FIG. 8, the machine-readable storage medium comprises program code to implement the print controller 850, e.g. that of FIG. 1 of the image processing apparatus of FIG. 2, or one or more of the methods of FIGS. 3 and 4. In certain cases, the machine-readable storage medium may also comprise one or more color mappings 860, which may be in the form of a spectral separation look-up table.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method comprising:
    mapping, by a processor of a printing system, an input color with associated spectral information to print control data using a spectral separation,
    the print control data having defined values for depositions with each combination of a plurality of colorants stored in a storage unit, each colorant comprising nanoparticles, each colorant having a specified spectral range, corresponding to its constituent nanoparticles, each colorant being additive in terms of a resulting spectral power distribution,
    wherein the print control data is usable to produce a print output using the plurality of colorants, and
    wherein a set of spectral ranges for the plurality of colorants provide a non-uniform distribution of at least one peak emission value and full-width at half-maximum value over a given spectral range.

2. The method of claim 1, wherein a set of nanoparticles for each colorant has a defined narrow-band spectral emission with a specified full-width at half-maximum value within a visible spectrum and a defined absorption profile outside of the visible spectrum.

3. The method of claim 1, wherein the plurality of colorants have a combined spectral range covering a visible spectrum, and each colorant is additive in terms of a resulting spectral power distribution.

4. The method of claim 1, wherein the spectral separation is used to generate a halftone output.

5. A computer-implemented method of generating a spectral mapping comprising:
    obtaining, by a processor of a printing system, spectral characteristics for a plurality of colorants stored in a storage unit, each colorant comprising nanoparticles, each colorant having a specified spectral range corresponding to its constituent nanoparticles, each colorant being additive in terms of a resulting spectral power distribution,
    characterizing spectral Neugebauer primaries for the plurality of colorants based on the obtained spectral characteristics, a spectral Neugebauer primary representing an available colorant overprint combination, said characterizing comprising determining output spectra for one or more colorant-overprint distribution values for a print substrate;
    determining, based on the characterized spectral Neugebauer primaries, a plurality of key nodes that map at least one input spectral value to a print control vector comprising colorant distribution values for each of the spectral Neugebauer primaries; and
    generating the spectral mapping by interpolating between the key nodes.

6. The method of claim 5, wherein a set of nanoparticles for each colorant has a defined narrow-band spectral emission with a specified full-width at half-maximum value within the visible spectrum and a defined absorption profile outside of the visible spectrum.

7. The method of claim 5, wherein characterizing spectral Neugebauer primaries comprises defining a colorant-limited gamut based on the spectral characteristics.

8. The method of claim 5, wherein the spectral separation comprises a look-up-table with a spectral Neugebauer primary area coverage vector at each node.

9. The method of claim 6, wherein the input spectral value comprises one of an input reflectance and a normalized spectral power distribution and the input spectral value is mapped either:
    i) directly to the spectral Neugebauer primary area coverage vector at each node, or
    ii) indirectly to a data value between nodes using interpolation between the spectral Neugebauer primary area coverage vector at one or more nodes proximate to the data value.

10. A system for spectral printing comprising:
    a storage unit storing a plurality of colorants; and
    a print controller to map an input color with associated spectral information to a spectral Neugebauer primary area coverage vector using a spectral separation,
    wherein the spectral Neugebauer primary area coverage vector defines values for depositions with each combination of the plurality of colorants stored in the storage unit, each colorant comprising nanoparticles, each colorant having a specified spectral range corresponding to its constituent nanoparticles, each colorant being additive in terms of a resulting spectral power distribution,
    wherein the print controller is to communicate the spectral Neugebauer primary area coverage vector to a printing device to generate a print output using the plurality of colorants, and
    wherein each of the plurality of colorants includes a set of nanoparticles that has a defined narrow-band spectral emission with a specified full-width at half-maximum value within a visible spectrum and a defined absorption profile outside of the visible spectrum.

11. The system of claim 10, wherein the nanoparticles comprise quantum dots.

12. The system of claim 10, wherein a set of spectral ranges for the plurality of colorants provide a non-uniform distribution of peak emission values within a given spectral range.

13. The system of claim 10, wherein the spectral separation or print data is used to generate a halftone output.

* * * * *